(12) United States Patent  
Kang et al.

(10) Patent No.: US 11,978,142 B2  
(45) Date of Patent: May 7, 2024

(54) METHOD AND DEVICE FOR SYNTHESIZING MOTION SEQUENCE OF VIRTUAL OBJECT

(71) Applicant: TENCENT TECHNOLOGY (SHENZHEN) COMPANY LIMITED, Guangdong (CN)

(72) Inventors: Di Kang, Guangdong (CN); Jing Li, Guangdong (CN); Weidong Chen, Guangdong (CN); Wei Zhang, Guangdong (CN); Liang Qiao, Guangdong (CN); Linchao Bao, Guangdong (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 119 days.

(21) Appl. No.: 17/680,706

(22) Filed: Feb. 25, 2022

(65) Prior Publication Data

US 2022/0292752 A1     Sep. 15, 2022

Related U.S. Application Data

(63) Continuation of application No. PCT/CN2020/127484, filed on Nov. 9, 2020.

(30) Foreign Application Priority Data

Mar. 4, 2020   (CN) .......................... 202010142920.2

(51) Int. Cl.
*G06T 13/40* (2011.01)
*G06T 7/246* (2017.01)
*G06V 20/40* (2022.01)

(52) U.S. Cl.
CPC .............. *G06T 13/40* (2013.01); *G06T 7/251* (2017.01); *G06V 20/46* (2022.01)

(58) Field of Classification Search
None
See application file for complete search history.

(56) References Cited

U.S. PATENT DOCUMENTS

2004/0246255 A1   12/2004   Lin et al.
2009/0102807 A1*  4/2009   Kashiwa ................ G09G 3/344
                                                           386/362

(Continued)

FOREIGN PATENT DOCUMENTS

CN           1949274 A      4/2007
CN         102179048 A      9/2011

(Continued)

OTHER PUBLICATIONS

Oshita M: "Generating Animation from Natural Language Texts and Framework of Motion Database", Cyberworlds, 2009. CW '09. International Conference on, IEEE, Piscataway, NJ, USA, Sep. 7, 2009, pp. 146-153.

(Continued)

*Primary Examiner* — Frank S Chen
(74) *Attorney, Agent, or Firm* — ARENTFOX SCHIFF LLP (57) ABSTRACT

A method, device, and apparatus for synthesizing a motion sequence of a virtual object and a non-transitory computer-readable storage medium are disclosed. The method can include obtaining description information of a motion sequence of a virtual object, and determining a continuous motion clip set similar to at least some motions in the motion sequence based on the description information and a continuous motion clip library constructed with video materials. The method can further include synthesizing the motion sequence of the virtual object based on the continuous motion clip set, where each continuous motion clip in the continuous motion clip library includes a unique identifier of the continuous motion clip, motion information of the con- (Continued)

tinuous motion clip, and a representation vector corresponding to the each continuous motion clip.

20 Claims, 4 Drawing Sheets

(56) References Cited

U.S. PATENT DOCUMENTS

| | | | |
|---|---|---|---|
| 2009/0150920 A1* | 6/2009 | Jones | H04N 21/4788 725/23 |
| 2018/0322670 A1 | 11/2018 | Tanda et al. | |
| 2019/0394443 A1* | 12/2019 | Schickel | H04N 13/122 |

FOREIGN PATENT DOCUMENTS

| | | |
|---|---|---|
| CN | 103678569 A | 3/2014 |
| CN | 104484034 A | 4/2015 |
| CN | 106548503 A | 3/2017 |
| CN | 108665492 A | 10/2018 |
| CN | 108986186 A | 12/2018 |
| CN | 109118562 A | 1/2019 |
| CN | 110033505 A | 7/2019 |
| CN | 110047121 A | 7/2019 |
| CN | 110125932 A | 8/2019 |
| CN | 110533752 A | 12/2019 |
| CN | 110637326 A | 12/2019 |
| CN | 110858409 A | 3/2020 |
| CN | 111369687 A | 7/2020 |
| JP | 2002269580 A | 9/2002 |
| JP | 2019103728 A | 6/2019 |
| JP | 2019-197368 A | 11/2019 |
| WO | 2020/027294 A1 | 2/2020 |

OTHER PUBLICATIONS

Wenyu Lu et al: "A Motion Retargeting Method for Topologically Different Characters", Computer Graphics, Imaging and Visualization, 2009. CGIV '09. Sixth International Conference on, IEEE, Piscataway, NJ, USA, Aug. 11, 2009, pp. 96-100.
Jiun-Yu Kao et al: "Graph-based approach for motion capture data representation and analysis", 2014 IEEE International Conference on Image Processing (ICIP), IEEE, Oct. 27, 2014, pp. 2061-2065.
Yisheng Chen et al: "Markerless monocular motion capture using image features and physical constraints", Computer Graphics International 2005 Stony Brook, NY, USA Jun. 22-24, 2005, Piscataway, NJ, USA, IEEE, Jun. 22, 2005, pp. 36-43.
Supplementary European Search Report issued in Application No. 20923172.9, dated Jan. 10, 2023, 10 pages.
Kanazawa, Angjoo, Michael J Black, David W Jacobs, and Jitendra Malik. "End-to-End Recovery of Human Shape and Pose." Paper presented at the Proceedings of the IEEE Conference on Computer Vision and Pattern Recognition, 2018.
Kovar, Lucas, Michael Gleicher, and Frédéric Pighin. "Motion Graphs." Paper presented at the ACM SIGGRAPH 2008 classes, 2008.
Lee, Yongjoon, Kevin Wampler, Gilbert Bernstein, Jovan Popovi, and Zoran Popovi. "Motion Fields for Interactive Character Animation." Communications of the ACM 29, No. 6 (2010): 1-8.
Villegas, Ruben, Jimei Yang, Duygu Ceylan, and Honglak Lee. "Neural Kinematic Networks for Unsupervised Motion Retargeting." Paper presented at the Proceedings of the IEEE Conference on Computer Vision and Pattern Recognition, 2018.
International Search Report dated Jan. 27, 2021 issued in corresponding application PCT/CN2020/127484 (with English translation) Office Action dated Sep. 29, 2020 issued in corresponding Chinese.
Office Action dated Sep. 29, 2020 issued in corresponding Chinese patent application No. 202010142920.2 (with English translation).
Japanese Office Action issued in Application No. 2022-532845, dated Jun. 26, 2023, 12 pages.
Japanese Office Action issued in Application No. 2022-532845, mailed Dec. 25, 2023, 11 pages.

* cited by examiner

First frame          Second frame

METHOD AND DEVICE FOR SYNTHESIZING MOTION SEQUENCE OF VIRTUAL OBJECT

RELATED APPLICATION

This application is a continuation of International Application No. PCT/CN2020/127484, filed on Nov. 9, 2020, which claims priority to Chinese Patent Application No. 202010142920.2, entitled "METHOD AND DEVICE FOR SYNTHESIZING MOTION SEQUENCE OF VIRTUAL OBJECT" filed on Mar. 4, 2020. The entire disclosures of the prior applications are hereby incorporated by reference in their entirety

FIELD OF THE TECHNOLOGY

This application relates to the service field of artificial intelligence, including a method, device, and apparatus for synthesizing a motion sequence of a virtual object and a computer-readable storage medium. This application further relates to a method for generating a video of a motion of a virtual object.

BACKGROUND OF THE DISCLOSURE

Currently, motions of virtual objects, such as a virtual person, a virtual animal, a three-dimensional cartoon object, and the like, mainly rely on manual design of artists. Generally, after completing design of one or more motions, such as a virtual object runs, jumps, or walks, the artist can store the motions and keywords of the motions correspondingly into a database. A computer can subsequently read the motion description information of a virtual person, for example, "David jumps after walking for a while", and then read a corresponding motion design through keyword matching, to complete concatenation of a motion sequence of the virtual object "David."

SUMMARY

Embodiments of this application provide a method for synthesizing a motion sequence of a virtual object. The method can include obtaining, by processing circuitry, description information of a motion sequence of the virtual object, and determining, by processing circuitry, a continuous motion clip set similar to at least some motions in the motion sequence based on the description information and a continuous motion clip library constructed with video materials. Further, the method can include synthesizing, by processing circuitry, the motion sequence of the virtual object based on the continuous motion clip set. Each continuous motion clip in the continuous motion clip library includes a unique identifier of the continuous motion clip, motion information of the continuous motion clip, and a representation vector corresponding to the each continuous motion clip.

Further aspects of the disclosure can provide that the determining the continuous motion clip set further includes obtaining a representation vector of the motion sequence of the virtual object based on the description information, the representation vector of the motion sequence of the virtual object linking semantic information and motion attribute information of the motion sequence, and determining a continuous motion clip set in the continuous motion clip library that is similar to the at least some motions in the motion sequence based on the representation vector of the motion sequence of the virtual object.

Additional aspects of the disclosure can provide a method for generating a video of a motion of a virtual object. The method can include obtaining, by processing circuitry, text information or audio information describing a motion sequence of the virtual object, and retargeting, by processing circuitry, the motion sequence of the virtual object to the virtual object based on the text information or audio information, to output a video of a motion of the virtual object. The video of motion of the virtual object can be synthesized based on a continuous motion clip set that is in a continuous motion clip library constructed with video materials and is similar to at least some motions in the motion sequence. Each continuous motion clip in the continuous motion clip library includes a unique identifier of the continuous motion clip, motion information of the continuous motion clip, and a representation vector corresponding to the each continuous motion clip.

Other embodiments of the disclosure can provide a device for synthesizing a motion sequence of a virtual object. The device can include a motion sequence obtaining device that is configured to obtain description information of a motion sequence of a virtual object, and a similar motion clip obtaining device that is configured to determine a continuous motion clip set similar to at least some motions in the motion sequence based on the description information and a continuous motion clip library constructed with video materials. The device can further include a motion synthesis device that is configured to synthesize the motion sequence of the virtual object based on the continuous motion clip set. Each continuous motion clip in the continuous motion clip library can include a unique identifier of the continuous motion clip, motion information of the continuous motion clip, and a representation vector corresponding to the each continuous motion clip.

BRIEF DESCRIPTION OF THE DRAWINGS

Various exemplary embodiments of this disclosure that are proposed as examples will be described in detail with reference to the following figures, wherein like numerals reference like elements, and wherein.

DESCRIPTION OF EMBODIMENTS

To make objectives, technical solutions, and advantages of this application more obvious, exemplary embodiments according to this application are described below in detail with reference to the accompanying drawings. Apparently, the described embodiments are merely some but not all of the embodiments of this application. It is to be understood that, this application is not limited by the exemplary embodiments described herein.

In this specification and accompanying drawings, substantially the same or similar steps and elements are represented by the same or similar reference signs, and repeated descriptions of the steps and elements will be omitted. In addition, in the descriptions of this application, the terms "first", "second", and the like are used merely for distinction and are not to be construed as indicating or implying relative importance or sorting.

For the convenience of describing this application, concepts related to this application are described below.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions, such as a computer vision (CV) technology, a speech processing technology, a natural language processing technology, and machine learning/deep learning.

Nature Language processing (NLP) is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

Machine Learning (ML) is a multi-field interdiscipline, and relates to a plurality of disciplines, such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

In the exemplary embodiments of this application, models below may all be AI models, particularly, AI-based neural network models. Generally, an AI-based neural network model is implemented as an acyclic graph in which neurons are arranged at different layers. Generally, a neural network model includes an input layer, an output layer. The input layer and the output layer are separated from each other by at least one hidden layer. The hidden layer transforms an input received from the input layer into a representation useful for generating an output at the output layer. A network node is fully connected to nodes at an adjacent layer by edges, and there is no edge between nodes at each layer. Data received at a node of the input layer of the neural network is propagated to a node of the output layer through any one of the hidden layer, an activation layer, a pooling layer, or a convolution layer. The input/output of the neural network model may be in various forms, which is not limited in this application.

With the research and progress of the AI technology, the AI technology is studied and applied to a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application relate to technologies such as AI, NLP, and ML, which are specifically described by using the following embodiments.

Figure 1:
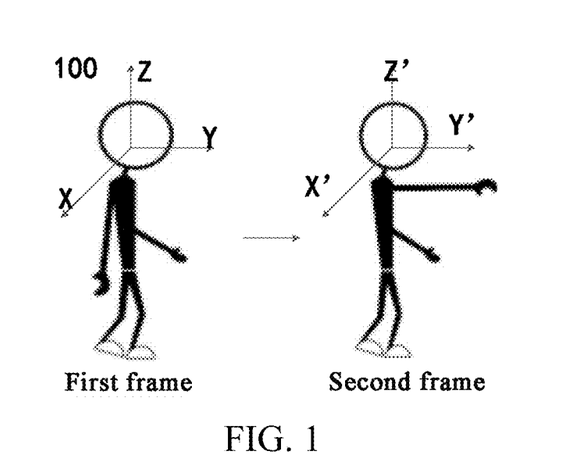
FIG. 1 is a schematic diagram of a scenario of designing a motion sequence for a virtual object.

A motion sequence of a virtual object implemented by relying on manual design of artists usually causes motions of the virtual object to be rigid. In addition, because a large quantity of artists are required to manually design motions, the presentation of the motions of the virtual object is excessively costly. FIG. 1 is a schematic diagram of a scenario 100 of designing a motion sequence for a virtual object.

Currently, motions of virtual objects (for example, a virtual person, a virtual animal, a three-dimensional cartoon object, and the like) mainly rely on manual design of artists. For example, it is assumed that the artists want to design a motion of swinging arms for a virtual person "David" in FIG. 1. The artists may design motion information of all moving portions, for example, the head, left hand, right hand, left arm, right arm, left leg, and right leg of "David" within a motion duration of the motion of swinging arms. The motion information includes three-dimensional coordinates, rotation angles, motion accelerations, and the like of all the moving portions in the frame. For example, in the first frame, the three-dimensional coordinates of the head of "David" are (X, Y, Z), and in the second frame, the three-dimensional coordinates of the head of "David" are (X', Y', Z').

When the artists complete designing the motion of the virtual object "David" in all frames, motion information of the motion and a motion name "swings his arms" are correspondingly stored. Because the virtual object may have a large quantity of motions, requiring a large quantity of artists to design the motions, designing the motion animation of the virtual object is excessively costly.

After completing the design of each single motion, a computing device reads motion description information of a virtual object "David", for example, "David swings his arms after walking for a while", and then reads corresponding motion designs "walking" and "swings his arms" through keyword matching, to trigger corresponding motions, thereby completing concatenation and synthesis of a motion sequence of the virtual object "David". However, because a corresponding motion is triggered only when a keyword completely the same as the motion name appears in the motion description information, and the virtual person "David" keeps stationary in the remaining time, a rigid synthesis effect is caused. For example, if the motion description information records "David swings his two arms after walking for a while", because a motion library does not include the motion "swings his two arms", in the finally synthesized motion, "David" may keep stationary after walking for a while and does not have effect of swinging two arms.

The embodiments of this application provide a method for synthesizing a motion sequence of a virtual object. In this method, motion information is extracted from real videos, to greatly reduce the workload of artists. In addition, in this method, a motion similar to a keyword in the motion description information may be found by searching a continuous motion clip library, to avoid the synthesized motion of the virtual object from being rigid.

Figure 2A:
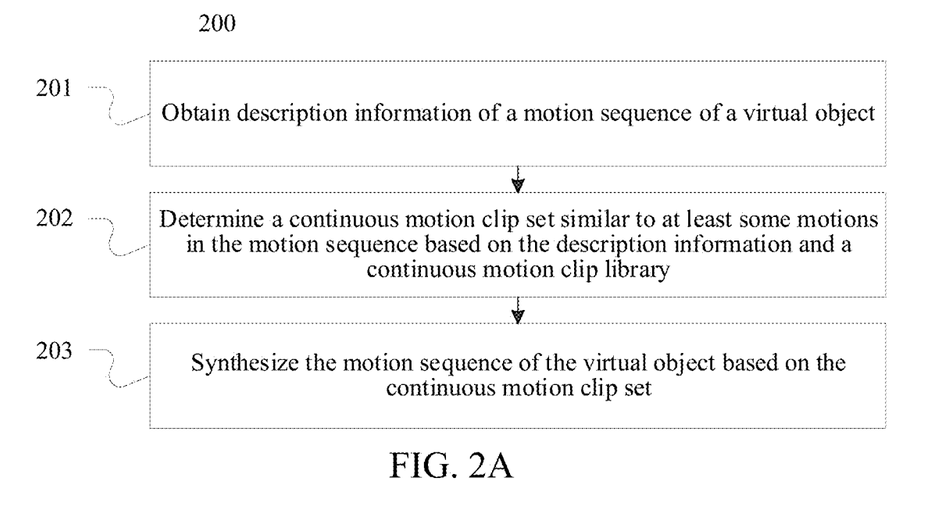
FIG. 2A is a flowchart of a method for synthesizing a motion sequence of a virtual object according to an embodiment of this disclosure.
Figure 2B:
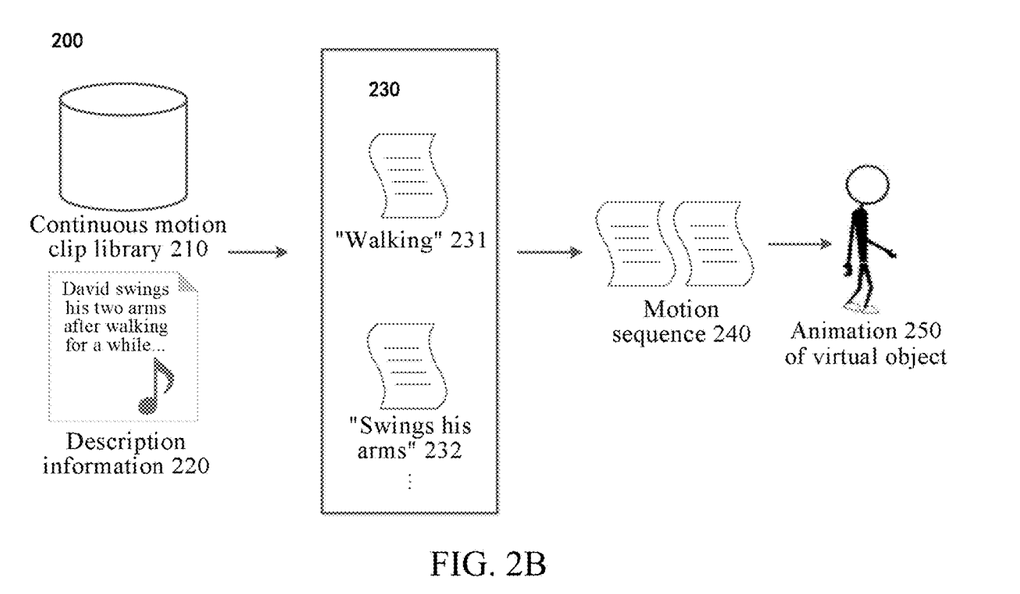
FIG. 2B is a schematic diagram of a method for synthesizing a motion sequence of a virtual object according to an embodiment of this disclosure.
Figure 2C:
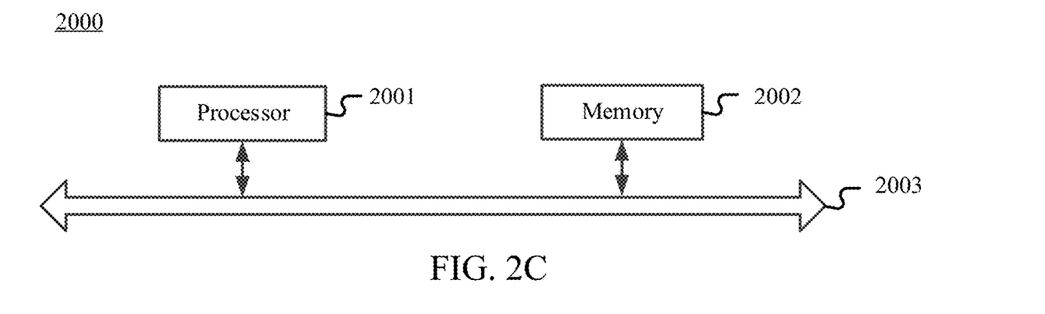
FIG. 2C is a structural diagram of a device for synthesizing a motion sequence of a virtual object according to an embodiment of this disclosure.

FIG. 2A is a flowchart of a method 200 for synthesizing a motion sequence of a virtual object according to an exemplary embodiment of this application. FIG. 2B is a schematic diagram of a method 200 for synthesizing a motion sequence of a virtual object according to an exemplary embodiment of this application. FIG. 2C is a structural diagram of a device 2000 for synthesizing a motion sequence of a virtual object according to an exemplary embodiment of this application.

The method 200 for synthesizing a motion sequence of a virtual object according to this embodiment of this application can be applied to any electronic device. It may be understood that, the electronic device may be different types of hardware devices, for example, a personal digital assistant (PDA), an audio/video device, a mobile phone, a Moving Picture Experts Group Audio Layer III (MP3) player, a personal computer, a laptop computer, and a server. For example, the electronic device may be the device 2000 for synthesizing a motion sequence of a virtual object in FIG. 2C. This application is described below using the device 2000 as an example, and it should be understood by a person skilled in the art that this application is not limited thereto.

Referring to FIG. 2C, the device 2000 may include a processor 2001 and a memory 2002. The processor 2001 and the memory 2002 may be connected to each other by a bus 2003.

The processor 2001 can perform various operations and processing according to a program stored in the memory 2002. Specifically, the processor 2001 may be any processor circuitry, such as an integrated circuit chip, that has a signal processing capability. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component, and may implement or perform the methods, the steps, and logic block diagrams that are disclosed in the embodiments of this application. The general-purpose processor may be a microprocessor. Alternatively, the processor may be any conventional processor or the like, and may be in the X87 architecture or the ARM architecture.

The memory 2002 stores computer instructions, the computer instructions, when executed by the processor, implementing the method 200. The memory 2002 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. In illustrative but not limitative descriptions, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory described in this application aims to include but not limited to these memories and any other suitable types of memories.

Referring to FIG. 2A, first, in operation 201, the device 2000 may obtain description information of a motion sequence of a virtual object.

The virtual object can include a virtual person, a virtual animal, a three-dimensional cartoon object, and the like. A motion sequence of the virtual object may include motion information of all moving portions of the virtual object in each frame of a video or another presentation manner. The motion information includes at least one of positions, speeds, or accelerations of the moving portions. For a virtual person, the moving portions may include moving joints such as the head, two hands, and elbows. For a virtual animal, the moving portions may include moving joints such as four limbs and the tail. The motion information may be stored as a 3D pose. Types of the virtual object and moving portions are not limited in this application.

The description information of the motion sequence of the virtual object may be description information 220 shown in FIG. 2B. The description information 220 can not only record a clip of motions of the virtual object in the form of text, for example, "David swings his two arms after walking for a while" shown in FIG. 2B, but also describe the motions of the virtual object in the form of audio. For example, the description information 220 may describe a mood of the motions of the virtual object with a piece of exciting music or a rhythm of the motions of the virtual object with a drum beat. When the description information 220 is audio information, the description information 220 may further include a dialog of the virtual object, a narration of a scene, or the like. The form of the description information 220 is not limited in this application.

Subsequently, in operation 202, the device 2000 determine a continuous motion clip set similar to at least some motions in the motion sequence based on the description information and a continuous motion clip library.

Referring to FIG. 2B, the device 2000 may determine a continuous motion clip set 230 in the continuous motion clip library 210 similar to the at least some motions in the motion sequence in various manners. For example, the device 2000 may compare any one of semantic information, for example, a title, a subtitle, and motion description, or motion attribute information, for example, a motion rhythm and a motion mood, of each continuous motion clip in the continuous motion clip library 210 with some clips in the description information 220, calculate similarities therebetween, and then select the top k continuous motion clips with the highest similarities as the continuous motion clip set 230, k being an integer greater than 0. As shown in FIG. 2B, the continuous motion clip set 230 may include a plurality of continuous motion clips, for example, continuous motion clips 231 and 232.

In this exemplary embodiment of this application, operation 202 may further include: obtaining a representation vector of the motion sequence of the virtual object based on the description information, the representation vector fusing semantic information and motion attribute information of the motion sequence; and determining a continuous motion clip set in the continuous motion clip library similar to motions in the motion sequence based on the representation vector of the motion sequence of the virtual object.

The representation vector of the motion sequence of the virtual object may be a multimodal representation vector. The modality may indicate a source or form of information. For example, when the description information 220 includes not only text information but also audio information, the audio information, the text information, or the like of the description information 220 may be referred to as a modality. Different modalities have different statistical characteristics, and include different information. For example, the audio information is usually expressed as the frequency, the amplitude, the timbre, or the like, but the text information is usually expressed as discrete words or sentences. Therefore, to better represent features of the description information 220, the device 2000 may extract different feature information from the audio information and text information of the description information 220 respectively, and perform fusion and correlation analysis on the feature information.

To obtain the representation vector of the description information 220, the device 2000 may extract motion attribute information from audio information of the description information 220. The motion attribute information includes at least one of a motion rhythm or a motion mood of the virtual object. In this embodiment of this application, the motion attribute information may be a representation vector fusing the motion rhythm and the motion mood of the virtual object. For example, the device 2000 may convert the audio information of the description information 220 into a representation vector of an audio feature of the description information 220 using the Vggish model. The device 2000 constructs the Mel-Frequency Cepstral Coefficients (MFCC) feature or Log-Melfeature representing the audio information by parsing the audio information. In this embodiment of this application, the device 2000 may further perform timing fusion on the MFCC feature or Log-Mel feature to construct a representation vector that is more representative. Certainly, the device 2000 may alternatively obtain the representation vector of the audio information of the description information 220 by using another neural network model, which is not limited in this application.

To obtain the representation vector of the description information 220, the device 2000 may extract semantic information from the text information of the description information 220. The device 2000 may further parse the modal information in the form of text, for example, "David swings his two arms after walking for a while" in FIG. 2B, to obtain the semantic information of the description information 220, and then convert it into a representation vector for description information 220. For example, the device 2000 can segment the text information of the description information 220 into a plurality of words using the Bidirectional Encoder Representations from Transformers (BERT) algorithm, then, converts the words into word vectors through word embedding, and finally, concatenate the word vectors together as the representation vector of description information 220. The encoding neural network model (encoder) in the BERT algorithm can convert the word vectors into encoded hidden state vectors. In some embodiments, the encoding neural network model may be implemented as a long short-term memory neural network model, and it may be understood that the encoding neural network model may alternatively be implemented as any neural network model that can encode a word vector to obtain an encoded hidden state vector. Through the BERT algorithm, the device 2000 can extract context-related natural language features from the description information 220. The algorithm maps words into word vectors, so that word vectors corresponding to the semantically similar words are more similar. Certainly, the device 2000 may alternatively obtain the representation vector of the semantic information of the description information 220 by using another neural network model, which is not limited in this application.

If the description information 220 not only includes text information, but also includes audio information, a representation vector of the text information and a representation vector of the audio information may be complementary and redundant. The device 2000 can further process the two representation vectors of the description information 220 in various manners, so as to obtain a representation vector that can represent the two. Generally, a process of digitizing feature information included in data of a plurality of modalities into a real-valued vector is referred to as multimodal representation. The multimodal representation may include multimodal fusion representation and multimodal deep representation. The process of integrating (for example, simply concatenating) features of different modalities into a single vector may be referred to as multimodal fusion representation, and the integrated single vector can be referred to as a multimodal fusion representation vector. A vector obtained by further analyzing the multimodal fusion representation vector may be referred to as a multimodal deep representation vector. For example, the multimodal fusion representation vector of the description information 220 may be further abstracted into a higher-level vector by using the neural network model. The vector is also referred to as a multimodal deep representation vector. The multimodal deep representation vector may be a multidimensional floating point number vector, for example, a 128-bit floating point type vector. The representation vector recorded in this application may be a multimodal fusion representation vector or a multimodal deep representation vector. The specific representation of the representation vector of the description information 220 is not limited in this application.

Because the multimodal deep representation vector represents the description information 220 in the form of a vector, and covers information about a plurality of modalities, a continuous motion clip can be retrieved faster and more accurately by using the multimodal deep representation vector, so that the continuous motion clip set 230 can be obtained more conveniently.

The continuous motion clip library 210 is constructed based on video materials. The video materials may be existing movies, existing TV dramas, existing featurettes, or the like, or may be online video materials. The device 2000 extracts motion information of one or more continuous motions of a moving object, for example a live actor, from the video materials to construct the continuous motion clip library 210. For example, a continuous motion includes a motion of a moving object in completing one step, a motion from jumping to landing, or the like. The continuous motion clip includes motion information of the complete continuous motion. Certainly, continuous motions may have the same or different durations, which is not limited in this application.

Each continuous motion clip in the continuous motion clip library 210 includes a unique identifier of the continuous motion clip, motion information of the continuous motion clip, and a representation vector corresponding to the each continuous motion clip. The representation vector corresponding to the each continuous motion clip may be a multimodal fusion representation vector or a multimodal deep representation vector as stated above, and fuses motion attribute information and semantic information of the video materials in the motion clip, and even screen information. The motion attribute information and the semantic information are extracted from audio data and text data of the video materials. FIG. 2B schematically shows two continuous motion clips in the continuous motion clip set 230. For example, for the continuous motion clip 231, a representation vector thereof fuses semantic information "walking" and motion attribute information (that is, a motion rhythm, a motion mood, and the like of the moving object in walking). A representation vector of the continuous motion clip 232 is fused with semantic information "swings his hands".

Therefore, the device 2000 may compare a representation vector of each motion sequence clip in the representation vector of the motion sequence of the virtual object with a representation vector corresponding to each continuous motion sequence clip in the continuous motion clip library 210. The smaller the distance between the two representation vectors, the higher the similarity between the two representation vectors. Therefore, a continuous motion clip set 230 similar to at least some motions in the motion sequence of the virtual object can be obtained.

Finally, in operation 203, the device 2000 synthesizes the motion sequence of the virtual object based on the continuous motion clip set.

If motion information of each motion in the motion sequence described by the description information 220 is similar to that of the continuous motion clip 231 or 232, the motion sequence of the virtual object may also be expressed using the motion information in the continuous motion clips 231 and 232. Therefore, the device 2000 can infer, according to the continuous motion clip set 230, that the motion information of the description information 220 "David swings his two arms after walking for a while" may also include motion information in "walking" and "swings his hands". The device 2000 may concatenate the continuous motion clip set 230 in an order of timing information of the motion sequence of the virtual object, so as to synthesize a motion sequence of the virtual object.

In this embodiment of this application, the device 2000 may retarget the synthesized motion to any virtual object in a virtual newscaster, a virtual game anchor, a virtual greeter, or a virtual shopping guide. Retargeting, particularly, motion retargeting, is a process of copying motion information from one source character to another character, that is, a target character, when sizes and proportions, for example, hands, legs, and the trunk of the objects are different. For example, in the video materials, a one-meter-six actor is walking, while the virtual object may be a one-meter-eight virtual greeter. Therefore, motion information of the actor needs to be changed, so as to better fit a motion state of the virtual greeter. Motion retargeting may migrate a motion of one set of bones to another set of bones according to some constraints, where lengths and proportions of different bones may be different. Common constraints are, for example, that the feet need to be on the ground, and rotation angles of different bones do not exceed some thresholds.

In the method 200, the problem that motions of a virtual object rely on artists is resolved by estimating the motion information from the video materials. Since, in the method 200, a large amount of video data on the Internet, or even online video data, may be utilized, the content in the continuous motion clip library 210 is richer and is less likely to be repeated. Alignment of the representation vector that fuses semantic information and motion attribute information enables a rhythm of the synthesized motion sequence to not only match a semantic meaning in text data but also match a rhythm and mood of a speech, so that the synthesized motion sequence is more natural. The method 200 may implement that, for example, the hands are swung up and down every time a word is spoken when a virtual newscaster slows down and emphasizes a specific phrase. In the method 200, a motion similar to a keyword in the motion description information may alternatively be retrieved from the continuous motion clip library 210, so that more candidate continuous motion clips can be obtained, so as to avoid the synthesized virtual object from being in a rigid stationary state most of the time, thereby achieving a more flexible simulation effect in an application scenario of virtual reality.

Figure 3A:
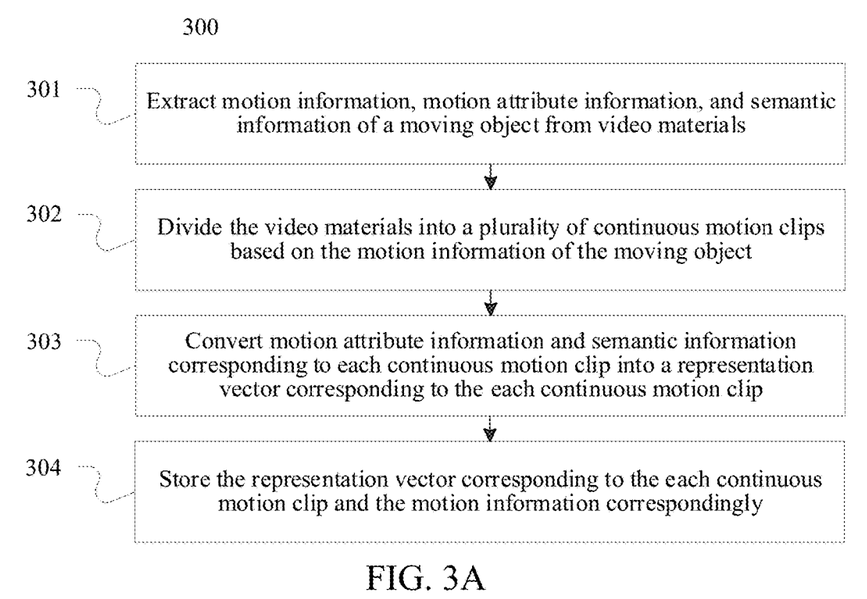
FIG. 3A is a flowchart of operations for constructing a continuous motion clip library according to an embodiment of this disclosure.
Figure 3B:
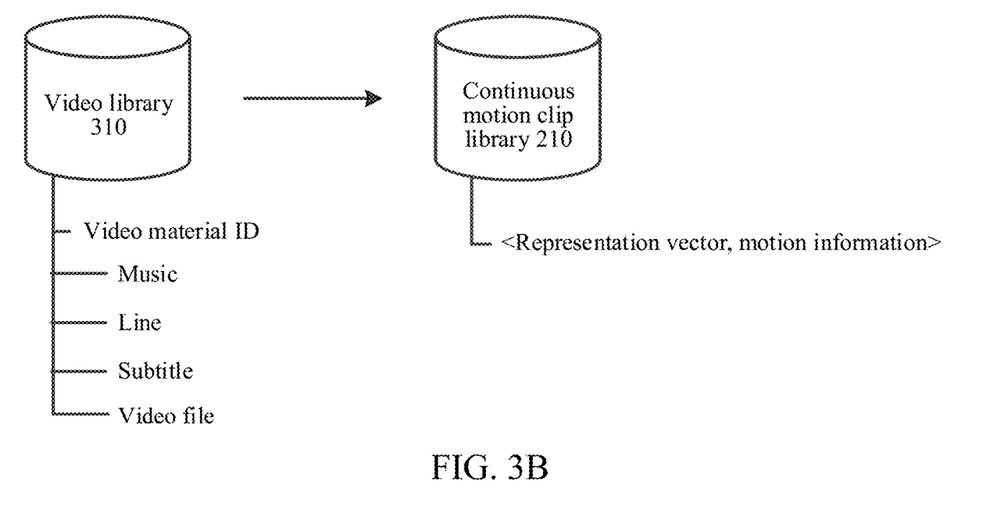
FIG. 3B is a schematic diagram of constructing a continuous motion clip library according to an embodiment of this disclosure.

FIG. 3A is a flowchart of operations 300 for constructing a continuous motion clip library according to an exemplary embodiment of this application. FIG. 3B is a schematic diagram of constructing a continuous motion clip library according to an exemplary embodiment of this application.

Referring to FIG. 3B, a video library 310 includes video information of a plurality of video materials. The video information of each video material includes a unique identifier (ID) of the video material, music, lines, subtitles, a video file, and the like. The video library 310 may be a database storing video information as a relationship database.

The continuous motion clip library 210 may use representation vectors of the continuous motion clips as keys and motion information as a value to construct key-value pairs, so that the continuous motion clip library 210 can correspondingly store the representation vectors of the continuous motion clips and the motion information. The continuous motion clip library 210 may be an Approximate Nearest Neighbor (ANN) retrieval database. In the ANN retrieval database, one or more pieces of data similar to a retrieval key, for example, the representation vector of the motion sequence of the virtual object, can be quickly found in using an ANN retrieval method. Specifically, in the ANN retrieval, the representation vector corresponding to the continuous motion clips in the continuous motion clip library 210 is classified or encoded through a data analysis and clustering method by utilizing features of clustered distribution formed between massive data. Next, a data category to which a query key belongs can be predicted according to the query key, and some or all of the returned categories are used as retrieval results. In this embodiment of this application, the continuous motion clip library 210 may be constructed as an ANN retrieval library by using tools such as Annoy and Faiss. Certainly, the ANN retrieval library may alternatively be constructed using another tool, which is not limited in this application. The continuous motion clip library 210 may alternatively be a database of another type, for example, a classical relationship database.

Although the continuous motion clip library 210 and the video library 310 are shown respectively in FIG. 3B, it is to be understood by a person skilled in the art that the continuous motion clip library 210 may be a database generated according to video library 310, or the continuous motion clip library 210 may be a part of the video library 310 provided that the continuous motion clip library 210 can store corresponding information.

To construct such a continuous motion clip library 210 from the video library 310, the device 2000 may perform operations 301-304 in FIG. 3A. Referring to FIG. 3A, in operation 301, the device 2000 may extract motion information, motion attribute information, and semantic information of a moving object from the video materials. As stated above, the motion information includes at least one of positions, speeds, or accelerations of the moving portions. The motion attribute information may include at least one of a motion rhythm or a motion mood of the moving object. The motion attribute information and the semantic information are extracted from audio data and text data of the video materials. The motion information is extracted from screen data in the video materials. For example, the device 2000 can estimate three-dimensional coordinates of moving portions, for example, human joints such as the head, hands, and elbows from each frame of the video materials. Then, the device 2000 can estimate parameters, such as a rotation angle, accelerations, including a rotation acceleration and a linear acceleration, and a speed, of a same moving portion in two or more adjacent frames according to three-dimensional coordinates of the moving portion.

In this embodiment of this application, operation 301 may further include: performing dimension reduction on the extracted motion information of the moving object. For example, the device 2000 may perform, by using a principal components analysis (PCA) algorithm, dimension reduction on features, such as positions, speeds, and accelerations, of all human joints estimated from the video, to retain only most important components in the motion information while discarding noise, so that the extracted motion information is smoother and more stable.

In addition, the semantic information and the motion attribute information may alternatively be represented as a representation vector in the manners described in FIG. 2A and FIG. 2B, the representation vector including timing information.

In operation 302, the device 2000 divides the video materials into a plurality of continuous motion clips based on the motion information of the moving object. A duration of a video can be as short as a few minutes or as long as a few hours. In a case of an excessive duration (too many frames), it is usually difficult for the semantic meaning, rhythm, and the like in the motion information of a complete video to meet requirements, and may also lead to a large amount of calculation, which is not conducive to feature similarity comparison. To help synthesize a motion, the device 2000 can divide, according to motions, pieces of motion information including too many frames into motion information clips including fewer frames. Such motion information clips are continuous motion clips. Each continuous motion clip includes motion information of a moving object completing a complete motion, for example, from jumping to landing, so that the device 2000 can more easily find motions that match the rhythm and semantic meaning, and then synthesize more diversified motions.

In this embodiment of the application, operation 302 may include determining a motion state of the moving object in each frame of the video materials; and dividing, in a case that a motion state of the moving object in at least one specific frame is stationary, the video materials into the plurality of continuous motion clips by using the at least one specific frame as a dividing point. For example, the device 2000 can train a support vector machine (SVM) classifier to determine whether the virtual object of each frame is in a moving state or stationary state. The SVM classifier can classify input information using a supervised ML algorithm. When the virtual object of a specific frame is in a stationary state, the frame can be considered as a specific frame. Then, the device 2000 may determine that a plurality of frame between two specific frames constitute a complete motion. Alternatively, the device 2000 can also preset a standard motion frame. The frame represents a starting state and a finishing state of completion of a motion, as it is assumed that a starting state and a finishing state of a motion are the same, for example, both a starting state and a finishing state of a jump are both standing still. Then, the device 2000 may compare motion information of each frame with motion information of the standard motion frame. If the $n^{th}$ frame and the $(n+k)^{th}$ frame are both similar to the motion information of the standard motion frame, it can be determined that a plurality of frames between the $n^{th}$ frame and the $(n+k)^{th}$ frame constitute a complete motion. The device 2000 may alternatively combine the foregoing two methods, for example, in a process of bouncing upward, there may be a case that motion information of a person that is not on the ground is the same as or similar to motion information of the standard motion frame, and in this case, the information may be classified by using the stationary state and the moving state, so that it can be determined that the person is still in motion, and a complete motion has not been completed. Therefore, a better classification result can be obtained by combining the two. It is to be understood by a person skilled in the art that the video materials may be divided in many other manners, which is not limited in this application.

In operation 303, the device 2000 converts motion attribute information and semantic information corresponding to each continuous motion clip into a representation vector corresponding to the each continuous motion clip. The device 2000 may according to divide the motion sequence and its corresponding semantic information and motion attribute information into clips according to the classification result, and associate the clips with motion information. In this embodiment of this application, representation vectors representing semantic information and motion attribute information in the video materials can be divided into a plurality of representation vectors according to the foregoing classification manner, each representation vector corresponding to one continuous motion clip, and fusing semantic information and motion attribute information of the continuous motion clip.

In operation 304, the device 2000 store a representation vector corresponding to each motion clip and a unique identifier and motion information of the motion clip correspondingly. For example, the pieces of information are correspondingly stored in the continuous motion clip library 210.

Therefore, through operation 301 to operation 304, the device 2000 can quickly obtain the continuous motion clip library 210.

Figure 4:
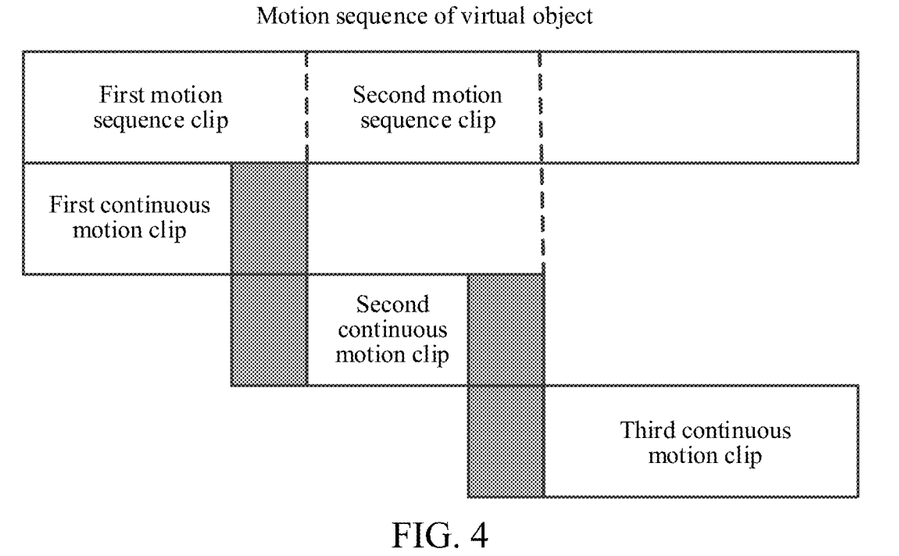
FIG. 4 is a schematic diagram of determining a continuous motion clip set that is in a continuous motion clip library and that is similar to at least some motions of a motion sequence according to an embodiment of this disclosure.

FIG. 4 is a schematic diagram of determining a continuous motion clip set that is in a continuous motion clip library and that is similar to at least some motions of a motion sequence according to an embodiment of this application. For example, referring to FIG. 4, the device 2000 obtains a representation vector of a first motion sequence clip based on the representation vector of the motion sequence of the virtual object. Then, the device 2000 obtains a first continuous motion clip based on the representation vector of the first motion sequence clip. A representation vector of the first continuous motion clip has a first similarity with the representation vector of the first motion sequence clip. The first similarity is greater than or equal to a similarity between a representation vector of another continuous motion clip in the continuous motion clip library and the representation vector of the first motion sequence clip.

For example, it is assumed that the continuous motion clip library 210 includes 100 continuous motion clips. Durations of/frames represented by continuous motion clips may be different. When obtaining the first motion sequence clip, the device 2000 may cut a representation vector having a duration the same as that of any continuous motion clip in the continuous motion clip library 210 from the representation vector of the motion sequence of the virtual object as a representation vector of a candidate motion sequence clip A, and then, calculate a similarity A' between the representation vector of the candidate motion sequence clip A and a representation vector of the continuous motion clip. Then, the device 2000 may cut a representation vector having a duration the same as that of another continuous motion clip from the representation vector of the motion sequence of the virtual object as a representation vector of a candidate motion sequence clip B, and then, calculate a similarity B' between the representation vector of the candidate motion sequence clip B and a representation vector of the continuous motion clip. The device 2000 compares the similarity A' and the similarity B', then selects a candidate motion sequence clip with a higher similarity, and continues to compare it with another candidate motion sequence clip until comparison of 100 continuous motion clips is completed, so as to select a continuous motion clip with the highest similarity as the first continuous motion clip. If continuous motion clips with different durations have the same similarity with their corresponding candidate motion sequence clips, a continuous motion clip with a shorter duration is selected as the first continuous motion clip.

Subsequently, device 2000 may obtain a representation vector of a second motion sequence clip based on the representation vector of the motion sequence of the virtual object, the second motion sequence clip being a next motion sequence clip of the first motion sequence clip. Then, the device 2000 may obtain a second continuous motion clip based on motion information of a plurality of end frames of the first continuous motion clip and the representation vector of the second motion sequence clip. A representation vector of the second continuous motion clip has a second similarity with the representation vector of the second motion sequence clip. The second similarity is greater than or equal to a similarity between a representation vector of another continuous motion clip in the continuous motion clip library and the representation vector of the second motion sequence clip.

As shown in FIG. 4, the gray part of the first continuous motion clip represents n end frames of the first continuous motion clip. It is assumed that the representation vector of the first continuous motion clip and a representation vector of the $1^{st}$ frame to the $k^{th}$ frame in the motion sequence of the virtual object are the most similar. Then, when obtaining the second continuous motion clip, the device 2000 may start to cut the representation vector of the motion sequence of the virtual object from the $(k-n)^{th}$ frame as a candidate motion sequence clip for obtaining the second continuous motion clip. For example, assuming that a second continuous motion clip with the same duration as a candidate motion clip C needs to be cut, and the candidate motion clip C includes m frames, representation information representing the $(k-n)^{th}$ frame to the $(k-n+m)^{th}$ frame in the representation vector of the motion sequence of the virtual object can be cut. Then, the device 2000 can obtain the second continuous motion clip in a manner similar to that of obtaining the first continuous motion clip.

Of course, it should be understood that this application is not limited to the foregoing manner of obtaining the first continuous motion clip and the second continuous motion clip. For example, the device 2000 may alternatively compress continuous motion clips in the continuous motion clip library 210 to the same duration, and then compare them with the representation vector of the motion sequence clip with a fixed duration. Alternatively, the device 2000 may complete the retrieval of the first continuous motion clip and the second continuous motion clip by utilizing characteristics of an adjacent retrieval library.

After obtaining the continuous motion clip set 230, the device 2000 may concatenate continuous motion clips in the continuous motion clip set 230. The concatenating includes fusing motion information of a plurality of end frames of a previous continuous motion clip and motion information of a plurality of starting frames of a current continuous motion clip in adjacent continuous motion clips. For example, the device 2000 may perform weighted averaging on rotation angles of n end frames of each continuous motion clip and n starting frame of a next continuous motion clip, so that the synthesized motion can be smoothly transitioned between different continuous motion clips, n being an even number. For example, it is assumed that the first continuous motion clip represents a motion from the $i^{th}$ frame to the $(i+l1)^{th}$ frame in the motion sequence of the virtual object. The second continuous motion clip represents a motion from the $(i+l1-n)^{th}$ frame to the $(i+l1-n+l2)^{th}$ frame in the motion sequence of the virtual object. To transition the continuous motion clip smoothly, the device fuses motion information representing n frames from the $(i+l1-n)^{th}$ frame to the $(i+l1)^{th}$ frame in the motion sequence of the virtual object in the first continuous motion clip with motion information representing n frames from the $(i+l1-n)^{th}$ frame to the $(i+l1)^{th}$ frame in the motion sequence of the virtual object in the second continuous motion clip. For example, the device 2000 may calculate an output rotation angle $Rot_{output}^{x}$ of each moving portion in the $x^{th}$ frame of the current continuous motion clip by using following formula.

$$Rot_{output}^{x} = Rot_{seg1}^{x} \times \frac{e^{-x}}{1+e^{-x}} + Rot_{seg2}^{x} \times \frac{1}{1+e^{-x}},$$

where $Rot_{seg1}^{x}$ is a vector, representing motion information of the $x^{th}$ frame virtual object of a previous continuous motion clip. Motion information of each moving portion may be represented by a rotation angle. For example, each element in the vector $Rot_{seg1}^{x}$ represents a rotation angle of a specific joint of a human body. $Rot_{seg2}^{x}$ represents a rotation angle of each moving portion in the $x^{th}$ frame of the current motion clip. A value range of x is $$\left[-\frac{n}{2}, \frac{n}{2}\right].$$

For example, it is assumed that the current continuous motion clip is the second continuous motion clip. When x=0, $Rot_{seg1}^{x}$ is a rotation angle of each moving portion of the virtual object in the $(l1-0.5*n)^{th}$ frame of the first continuous motion clip (which represents motion information of the $(i+l1-0.5*n)^{th}$ frame in the motion sequence of the virtual object when the first continuous motion clip is used for approximation). $Rot_{seg2}^{x}$ is a rotation angle of each moving portion of the virtual object in the $(0.5*n)^{th}$ frame of the second continuous motion clip (which represents motion information of the $(i+l1-0.5*n)^{th}$ frame in the motion sequence of the virtual object when the second continuous motion clip is used for approximation). In this case, x=0 is substituted into the foregoing formula, to obtain the rotation angle of the $(i+l1-0.5*n)^{th}$ frame in the motion sequence of the virtual object: $Rot_{output}^{x}=Rot_{seg1}^{x}\times 0.5+Rot_{seg2}^{x}\times 0.5$.

Through the above formula, weighted averaging is performed on the rotation angles of n end frames of the previous continuous motion clip and n starting frames of the current continuous motion clip. In addition, the weight of the previous continuous motion clip decreases as x increases, and the weight of the current continuous motion clip increases as x increases.

Figure 5:
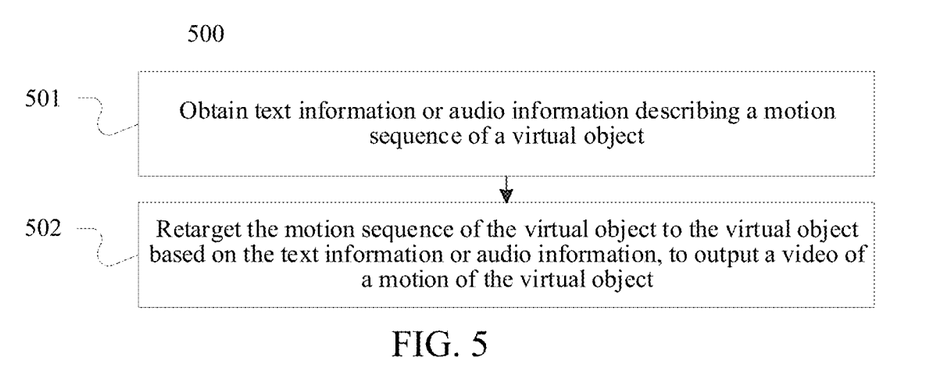
FIG. 5 is a flowchart of a method for generating a video of a motion of a virtual object according to an embodiment of this disclosure.

FIG. 5 is a flowchart of a method 500 for generating a video of a motion of a virtual object according to an embodiment of this application.

In operation 501, the device 2000 may obtain text information or audio information describing a motion sequence of a virtual object. Text information or audio information describing a motion sequence of a virtual object may be the description information 220 in the method 200. For example, text information may be "David swings his two arms after walking for a while". The description information may describe a mood of the motions of the virtual object with a piece of exciting music or a rhythm of the motions of the virtual object with a drum beat.

In operation 502, the device 2000 may retarget the motion sequence of the virtual object to the virtual object based on the text information or audio information, to output a video of a motion of the virtual object.

The video of motion of the virtual object is synthesized based on a continuous motion clip set that is in a continuous motion clip library constructed with video materials and that is similar to at least some motions in the motion sequence, and each continuous motion clip in the continuous motion clip library includes a unique identifier of the continuous motion clip, motion information of the continuous motion clip, and a representation vector corresponding to the each continuous motion clip. Similar to the method 200, the device 2000 may convert the text information or the audio information convert into a representation vector of the motion sequence of the virtual object, and then, retrieve a similar continuous motion clip set 230 from the continuous motion clip library 210. After completing concatenation of the continuous motion clip set 230, the device 2000 obtains the motion sequence of the virtual object.

The device 2000 may retarget the synthesized motion to any virtual object in a virtual newscaster, a virtual game anchor, a virtual greeter, or a virtual shopping guide. Retargeting may be copying motion information from one source character to another character, that is, a target character, when sizes and proportions, for example, hands, legs, and the trunk of the objects are different. For example, in the video materials, a one-meter-six actor is walking, while the virtual object may be a one-meter-eight virtual greeter. Therefore, motion information of the actor needs to be changed, so as to better fit a motion state of the virtual greeter. Motion retargeting may migrate a motion of one set of bones to another set of bones according to some constraints, where lengths and proportions of different bones may be different. Common constraints are, for example, that the feet need to be on the ground, and rotation angles of different bones do not exceed some thresholds. After the retargeting is completed, a video of the motion of the virtual object can be outputted.

The method 500 can output a video of a virtual object conforming to semantic information in text information and motion rhythm information of audio information only by inputting the text information or audio information, and the motion of the virtual object in the video is natural and not rigid.

Figure 6:
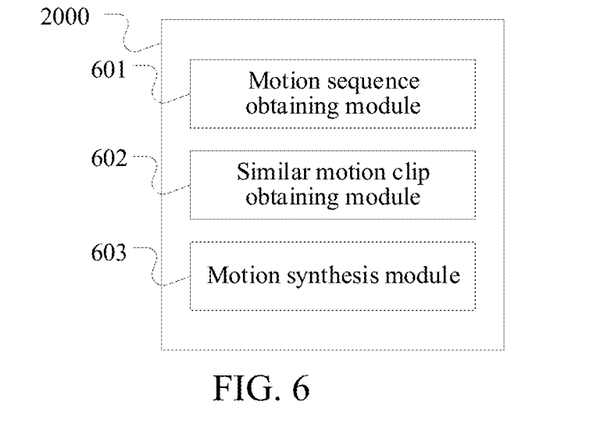
FIG. 6 is a structural diagram of a device for synthesizing a motion sequence of a virtual object according to an embodiment of this disclosure.

FIG. 6 is a structural diagram of a device 2000 for synthesizing a motion sequence of a virtual object according to an exemplary embodiment of this application. As shown, the device 2000 may include a motion sequence obtaining module 601, a similar motion clip obtaining module 602, and a motion synthesis module 603. Of course, it should be understood that one or more of the modules described in any of the exemplary embodiments of this disclosure can be implemented by hardware, such as processing circuitry, for example.

The motion sequence obtaining module 601 may be configured to obtain description information of a motion sequence of a virtual object. The virtual object includes a virtual person, a virtual animal, a three-dimensional cartoon object, and the like. A motion sequence of the virtual object may include motion information of all moving portions of the virtual object in each frame of a video or another presentation manner. The motion information includes at least one of positions, speeds, or accelerations of the moving portions.

The similar motion clip obtaining module 602 may be configured to determine a continuous motion clip set similar to at least some motions in the motion sequence based on the description information and a continuous motion clip library constructed with video materials. In this embodiment of this application, the similar motion clip obtaining module 602 may be further configured to obtain a representation vector of the motion sequence of the virtual object based on the description information, the representation vector fusing semantic information and motion attribute information of the motion sequence; and determine a continuous motion clip set in the continuous motion clip library similar to the at least some motions in the motion sequence based on the representation vector of the motion sequence of the virtual object. Each continuous motion clip in the continuous motion clip library includes a unique identifier of the continuous motion clip, motion information of the continuous motion clip, and a representation vector corresponding to the each continuous motion clip.

The motion synthesis module 603 may be configured to synthesize the motion sequence of the virtual object based on the continuous motion clip set. In this embodiment of this application, the device 2000 may retarget the synthesized motion to any virtual object in a virtual newscaster, a virtual game anchor, a virtual greeter, or a virtual shopping guide. Retargeting, particularly, motion retargeting, is a process of copying motion information from one source character to another character, that is, a target character, when sizes and proportions (for example, hands, legs, and the trunk) of the objects are different. For example, in the video materials, a one-meter-six actor is walking, while the virtual object may be a one-meter-eight virtual greeter. Therefore, motion information of the actor needs to be changed, so as to better fit a motion state of the virtual greeter. Motion retargeting may migrate a motion of one set of bones to another set of bones according to some constraints, where lengths and proportions of different bones may be different. Common constraints are, for example, that the feet need to be on the ground, and rotation angles of different bones do not exceed some thresholds.

The device 2000 resolves, by estimating the motion information from the video materials, the problem that motions of a virtual object rely on artists. The device 2000 may alternatively retrieve a motion similar to a keyword in the motion description information from the continuous motion clip library, so that more candidate continuous motion clips can be obtained, so as to avoid the synthesized virtual object from being in a rigid stationary state most of the time, thereby achieving a more flexible simulation effect in an application scenario of virtual reality.

An embodiment of this application can provide an apparatus for synthesizing a motion sequence of a virtual object. The apparatus can include a processor and a memory that can store non-transitory computer instructions that, when executed by the processor, cause the apparatus to implement the method 200 and the method 500.

An embodiment of this application provides a non-transitory computer-readable storage medium, storing computer instructions, the computer instructions, when executed by a processor, can cause an electronic device including the processor to implement the method 200 and the method 500.

In the method 200 and the method 500 according to the embodiments of this application, the problem that motions of a virtual object rely on artists is resolved by estimating the motion information from the video materials. Since, in the foregoing methods, a large amount of video data on the Internet may be utilized, the content in the continuous motion clip library is richer and is less likely to be repeated. Alignment of the representation vector that fuses semantic information and motion attribute information enables a rhythm of the synthesized motion sequence to not only match a semantic meaning in text data but also match a rhythm and mood of a speech, so that the synthesized motion sequence is more natural. The method 200 and method 500 may implement that, for example, the hands are swung up and down every time a word is spoken when a virtual newscaster slows down and emphasizes a specific phrase. In the method 200, a motion similar to a keyword in the motion description information may alternatively be retrieved from the continuous motion clip library (it is unnecessary to find a motion completely the same as the keyword), so that more candidate continuous motion clips can be obtained, so as to avoid the synthesized virtual object from being in a rigid stationary state most of the time, thereby achieving a more flexible simulation effect in an application scenario of virtual reality.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

In general, various exemplary embodiments of this application can be implemented in hardware or a dedicated circuit, software, firmware, logic, or any combination thereof. Some aspects can be implemented in hardware, while other aspects can be implemented in firmware or software executable by a controller, a microprocessor, or other computing devices. When various aspects of the embodiments of this application are illustrated or described as block diagrams, flowcharts, or represented by some other graphs, it is to be understood that the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

The exemplary embodiments of the present disclosure that are described above in detail are merely illustrative instead of limitative. It is to be understood by a person skilled in the art that the embodiments or features thereof can be modified and combined in various manners without departing from the principle and spirit of the present disclosure. Such modifications fall within the scope of the present disclosure.

What is claimed is:

1. A method for synthesizing a motion sequence of a virtual object, the method comprising:
    obtaining, by processing circuitry, description information of a motion sequence of the virtual object;
    determining, by processing circuitry, a continuous motion clip set corresponding to at least some motions in the motion sequence based on the description information and a continuous motion clip library constructed with video materials; and
    synthesizing, by processing circuitry, the motion sequence of the virtual object based on motion information of an end frame of a first continuous motion clip and motion information of a start frame of a second continuous motion clip of adjacent continuous motion clips in the continuous motion clip set, wherein
    each continuous motion clip in the continuous motion clip library includes a unique identifier of the respective continuous motion clip, the motion information extracted from the respective continuous motion clip, and a representation vector corresponding to the respective continuous motion clip, and
    the synthesizing includes concatenating the first continuous motion clip and the second continuous motion clip.

2. The method for synthesizing the motion sequence of the virtual object according to claim 1, wherein the determining the continuous motion clip set further comprises:
    obtaining a representation vector of the motion sequence of the virtual object based on the description information, the representation vector of the motion sequence of the virtual object linking semantic information and motion attribute information of the motion sequence; and
    determining the continuous motion clip set in the continuous motion clip library that corresponds to the at least some motions in the motion sequence based on the representation vector of the motion sequence of the virtual object.

3. The method for synthesizing the motion sequence of the virtual object according to claim 2, wherein the determining the continuous motion clip set in the continuous motion clip library corresponding to the at least some motions in the motion sequence further comprises:
obtaining a representation vector of a first motion sequence clip based on the representation vector of the motion sequence of the virtual object;
obtaining the first continuous motion clip based on the representation vector of the first motion sequence clip, a representation vector of the first continuous motion clip having a first similarity with the representation vector of the first motion sequence clip,
wherein the first similarity is greater than or equal to a similarity between a representation vector of another continuous motion clip in the continuous motion clip library and the representation vector of the first motion sequence clip.

4. The method for synthesizing the motion sequence of the virtual object according to claim 3, wherein the determining the continuous motion clip set in the continuous motion clip library corresponding to the at least some motions in the motion sequence further comprises:
obtaining a representation vector of a second motion sequence clip based on the representation vector of the motion sequence of the virtual object, the second motion sequence clip being a next motion sequence clip of the first motion sequence clip; and
obtaining the second continuous motion clip based on motion information of a plurality of end frames of the first continuous motion clip and the representation vector of the second motion sequence clip, a representation vector of the second continuous motion clip having a second similarity with the representation vector of the second motion sequence clip,
wherein the second similarity is greater than or equal to a similarity between a representation vector of another continuous motion clip in the continuous motion clip library and the representation vector of the second motion sequence clip.

5. The method for synthesizing the motion sequence of the virtual object according to claim 1, further comprising retargeting the synthesized motion sequence to the virtual object.

6. The method for synthesizing the motion sequence of a virtual object according to claim 1, wherein construction of the continuous motion clip library further comprises:
extracting the motion information, motion attribute information, and semantic information of at least one moving object from the video materials;
dividing the video materials into a plurality of continuous motion clips based on the motion information of the at least one moving object;
converting motion attribute information and semantic information corresponding to each continuous motion clip into the representation vector corresponding to the respective continuous motion clip; and
storing the representation vector corresponding to the each continuous motion clip and the motion information correspondingly.

7. The method for synthesizing the motion sequence of the virtual object according to claim 6, wherein:

the motion information includes at least one of a position, a speed, or an acceleration of each motion portion of the at least one moving object; and
the motion attribute information includes at least one of a motion rhythm or a motion mood of the at least one moving object,
the motion attribute information and the semantic information being extracted from audio data and text data of the video materials.

8. The method for synthesizing the motion sequence of the virtual object according to claim 6, further comprising performing dimension reduction on the extracted motion information of the moving object.

9. The method for synthesizing the motion sequence of the virtual object according to claim 6, wherein the dividing the video materials further comprises:
determining a motion state of the at least one moving object in each frame of the video materials; and
dividing the video materials into the plurality of continuous motion clips by using at least one specific frame as a dividing point, when a motion state of the at least one moving object in the at least one specific frame is stationary.

10. The method for synthesizing the motion sequence of the virtual object according to claim 1, wherein the synthesizing the motion sequence of the virtual object further comprises:
concatenating the continuous motion clip set using timing information of the motion sequence of the virtual object,
wherein the concatenating includes fusing motion information of a plurality of end frames of a previous continuous motion clip and motion information of a plurality of starting frames of a current continuous motion clip in adjacent continuous motion clips.

11. An apparatus for synthesizing a motion sequence of a virtual object, comprising:
a processor; and
a memory that stores non-transitory computer instructions that, when executed by the processor, cause the apparatus to implement the method according to claim 1.

12. A non-transitory computer-readable storage medium that stores computer instructions that, when executed by a processor, cause an electronic device including the processor to implement the method according to claim 1.

13. The non-transitory computer-readable storage medium according to claim 12, wherein the determining the continuous motion clip set corresponding to at least some motions in the motion sequence further comprises:
obtaining a representation vector of the motion sequence of the virtual object based on the description information, the representation vector of the motion sequence of the virtual object linking semantic information and motion attribute information of the motion sequence; and
determining the continuous motion clip set in the continuous motion clip library that corresponds to the at least some motions in the motion sequence based on the representation vector of the motion sequence of the virtual object.

14. The non-transitory computer-readable storage medium according to claim 13, wherein the determining the continuous motion clip set in the continuous motion clip library corresponding to the at least some motions in the motion sequence further comprises:

obtaining a representation vector of a first motion sequence clip based on the representation vector of the motion sequence of the virtual object; and obtaining the first continuous motion clip based on the representation vector of the first motion sequence clip, a representation vector of the first continuous motion clip having a first similarity with the representation vector of the first motion sequence clip, wherein the first similarity is greater than or equal to a similarity between a representation vector of another continuous motion clip in the continuous motion clip library and the representation vector of the first motion sequence clip.

15. A method for generating a video of a motion of a virtual object, the method comprising:

obtaining, by processing circuitry, text information or audio information describing a motion sequence of the virtual object; and retargeting, by processing circuitry, the motion sequence of the virtual object to the virtual object based on the text information or audio information, to output a video of a motion of the virtual object, wherein:

the video of the motion of the virtual object is synthesized based on motion information of an end frame of a first continuous motion clip and motion information of a start frame of a second continuous motion clip of adjacent continuous motion clips in a continuous motion clip set that is in a continuous motion clip library constructed with video materials and corresponds to at least some motions in the motion sequence, each continuous motion clip in the continuous motion clip library includes a unique identifier of the respective continuous motion clip, the motion information extracted from the respective continuous motion clip, and a representation vector corresponding to the respective continuous motion clip, and the synthesizing includes concatenating the first continuous motion clip and the second continuous motion clip.

16. The method for generating the video of the motion of the virtual object according to claim 15, wherein the virtual object is any one of a virtual newscaster, a virtual game anchor, a virtual greeter, or a virtual shopping guide.

17. An apparatus for synthesizing a motion sequence of a virtual object, comprising:

processing circuitry configured to:

obtain description information of a motion sequence of a virtual object;

determine a continuous motion clip set corresponding to at least some motions in the motion sequence based on the description information and a continuous motion clip library constructed with video materials; and synthesize the motion sequence of the virtual object based on motion information of an end frame of a first continuous motion clip and motion information of a start frame of a second continuous motion clip of adjacent continuous motion clips in the continuous motion clip set, wherein each continuous motion clip in the continuous motion clip library includes a unique identifier of the respective continuous motion clip, the motion information extracted from the respective continuous motion clip, and a representation vector corresponding to the respective continuous motion clip, and the processing circuitry is configured to concatenate the first continuous motion clip and the second continuous motion clip to synthesize the motion sequence of the virtual object.

18. The apparatus for synthesizing the motion sequence of the virtual object according to claim 17, wherein the processing circuitry configured to:

obtain a representation vector of the motion sequence of the virtual object based on the description information, the representation vector of the motion sequence of the virtual object linking semantic information and motion attribute information of the motion sequence; and determine the continuous motion clip set in the continuous motion clip library that corresponds to the at least some motions in the motion sequence based on the representation vector of the motion sequence of the virtual object.

19. The apparatus for synthesizing the motion sequence of the virtual according to claim 18, wherein the processing circuitry is configured to:

obtain a representation vector of a first motion sequence clip based on the representation vector of the motion sequence of the virtual object;

obtain the first continuous motion clip based on the representation vector of the first motion sequence clip, a representation vector of the first continuous motion clip having a first similarity with the representation vector of the first motion sequence clip, wherein the first similarity is greater than or equal to a similarity between a representation vector of another continuous motion clip in the continuous motion clip library and the representation vector of the first motion sequence clip.

20. The apparatus for synthesizing the motion sequence of the virtual according to claim 19, wherein the processing circuitry is configured to:

obtain a representation vector of a second motion sequence clip based on the representation vector of the motion sequence of the virtual object, the second motion sequence clip being a next motion sequence clip of the first motion sequence clip; and obtain the second continuous motion clip based on motion information of a plurality of end frames of the first continuous motion clip and the representation vector of the second motion sequence clip, a representation vector of the second continuous motion clip having a second similarity with the representation vector of the second motion sequence clip, wherein the second similarity is greater than or equal to a similarity between a representation vector of another continuous motion clip in the continuous motion clip library and the representation vector of the second motion sequence clip.

* * * * *